United States Patent [19]

Mausner

[11] Patent Number: 4,667,511

[45] Date of Patent: May 26, 1987

[54] FUEL INJECTOR NOZZLE WITH NEEDLE LIFT SENSOR

[75] Inventor: Eberhard Mausner, Ludwigsburg, Fed. Rep. of Germany

[73] Assignee: Voest-Alpine Aktiengesellschaft, Linz, Austria

[21] Appl. No.: 734,479

[22] Filed: May 14, 1985

[30] Foreign Application Priority Data

Jun. 13, 1984 [AT] Austria ........................ 1928/84

[51] Int. Cl.⁴ .................................... G01M 15/00

[52] U.S. Cl. .................................... 73/119 A

[58] Field of Search .................. 73/119 A; 350/96.15, 350/96.20, 96.29, 266, 286, 484; 356/375; 250/231 R, 229, 231 P, 227, 237 G

[56] References Cited

U.S. PATENT DOCUMENTS

| | | | |
|---|---|---|---|
| 4,103,261 | 7/1978 | Carr | 350/266 |
| 4,165,635 | 8/1979 | Komaroff et al. | 73/119 A |
| 4,176,908 | 12/1979 | Wagner | 350/96.15 |
| 4,356,979 | 11/1982 | Dobler | 73/119 A |
| 4,366,706 | 1/1983 | Wolff | 73/119 A |
| 4,404,841 | 9/1983 | Franke et al. | 73/35 |
| 4,413,509 | 11/1983 | Moser et al. | 73/117.3 |
| 4,429,219 | 1/1984 | Yochum et al. | 250/229 |
| 4,526,041 | 7/1985 | Beller et al. | 73/861.47 |

FOREIGN PATENT DOCUMENTS

| | | | |
|---|---|---|---|
| 2920669 | 11/1980 | Fed. Rep. of Germany . | |
| 3004424 | 8/1981 | Fed. Rep. of Germany . | |
| 0206872 | 12/1983 | Japan | 73/119 A |
| 0032813 | 2/1984 | Japan | 73/119 R |
| 2122373 | 1/1984 | United Kingdom | 350/286 |

*Primary Examiner*—Stewart J. Levy
*Assistant Examiner*—Robert R. Raevis
*Attorney, Agent, or Firm*—Lyon & Lyon

[57] ABSTRACT

A fuel injector nozzle, particularly for internal combustion engines, comprises a nozzle holder, which contains a valve needle, which is biased by a spring toward a closed position against the pressure of the liquid that is to be injected. The fuel injector nozzle is provided with a needle lift sensor comprising a position detector, which is contained in the nozzle unit and responsive to the position of the valve needle and a movable shielding member, which cooperates with the position detector and is mounted on that end of the valve needle which is remote from the valve seat or on a spring seat secured to said end of the valve needle. In order to provide a fuel injector valve which has a simple and inexpensive structure and yet delivers reliable measurements and will resist the thermal and mechanical loads to which it is subjected during operation and to permit the use of inexpensive means for evaluating the signal delivered by the needle lift sensor, the latter comprises light transmitting means, which define a light path, the shielding member consists of an optical shutter that is movable across said light path, and two optical glass fiber lines for transmitting light to and from said light path are connected to opposite ends thereof.

5 Claims, 8 Drawing Figures

FUEL INJECTOR NOZZLE WITH NEEDLE LIFT SENSOR

BACKGROUND OF THE INVENTION

1. Field of the Invention

This invention relates to a fuel injector nozzle provided with a needle lift sensor, particularly for internal combustion engines, comprising a nozzle holder, which contains a valve needle, which is biased by a spring toward a closing position against the pressure of the liquid that is to be injected, wherein the needle lift sensor is contained in the nozzle holder and responsive to the position of the valve needle and includes a movable shielding member, which is mounted on that end of the valve needle which is remote from the valve seat or on a spring seat secured to said end of the valve needle.

2. Description of the Prior Art

Internal combustion engines operating with fuel injection, particularly in diesel engines, are provided with fuel injection nozzles having a needle valve, which opens against the force of a valve spring when the pressure of the fuel delivered by the fuel injection pump rises to a predetermined value and which closes in response to a pressure drop. It is desirable to ascertain the exact time when the fuel injection begins and the duration of the fuel injection pulse because the fuel consumption rate can be determined from said parameters. The fuel consumption rate can be used for an indication of various data, such as the fuel consumption and the remaining cruising range, and for automatic control functions, e.g., in order to minimize the fuel consumption and the polluant content in the exhaust gas and to optimize the load on the engine.

A fuel injector nozzle of the kind described first hereinbefore has been disclosed in Published German Application No. 29 20 669. In that known valve a movable shielding member consisting of soft magnetic material is secured to a spring seat, which is secured to the top end of the valve needle. The shielding member is movable in the gap between a permanent magnet and a Hall effect sensor in such a manner that the Hall effect sensor will be exposed to or shielded from the magnetic field of the permanent magnet in dependence on the position of the valve needle.

A similar fuel injector nozzle disclosed in U.S. Pat. No. 4,366,706 comprises a small permanent magnet, which is secured to the spring seat and faces a Hall effect sensor, which is carried by a cylindrical bracket that is surrounded by the valve spring.

Published German Application No. 30 04 424 discloses a fuel injector nozzle in which the valve needle is provided at its top end with a pin, which constitutes a core extending in a stationary cylindrical coil. A movement of the valve needle and of the pin will change the inductance of the coil as an indication of the position of the valve needle.

In the fuel injector nozzles disclosed in Published German Application No. 29 20 669 and U.S. Pat. No. 4,366,706 the output voltage of the Hall effect sensor depends on the relative position of the magnet and of the valve needle. The beginning and duration of the fuel injection pulse can be determined from that output signal. But that known concept involves various disadvantages. In the first place, Hall effect sensors are expensive and delicate components and particularly the temperature rise and the vibration involved in the operation of an internal combustion engine will adversely affect the reliability of operation and the life of the sensor and the accuracy of the measurement. Errors may also be introduced into the measurement by stray electric or magnetic fields, which are inevitable in a motor vehicle. Owing to the design of the sensor the output signal is an analog signal so that a separate circuit is required for its utilization and the relative position of the magnet and the Hall effect sensor must be determined by a precise adjustment.

In accordance with Published German Application No. 32 41 390 an optical glass fiber line is used in conjunction with a fuel injector nozzle and serves to transmit light generated by a combustion flame.

SUMMARY OF THE INVENTION

It is an object of the invention to provide a fuel injector nozzle which is simple and inexpensive and delivers reliable measurements and which will withstand the thermal and mechanical stresses which occur during the operation of the unit in which the valve is employed. The sensor should deliver a signal which can be utilized by inexpensive means.

In a fuel injector nozzle of the kind described first hereinbefore that object is accomplished in accordance with the invention in that light transmitting means are provided, which define a light path, the shielding member consists of an optical shutter that is movable across said light path, and two optical glass fiber lines for transmitting light to and from said light path are connected to opposite ends thereof.

That fuel injector nozzle provided in accordance with the invention affords the advantage that the nozzle does not contain components which could be affected by stray magnetic or electric fields. The components employed are unaffected by high temperatures and vibration. The output signal is definite and can be utilized by extremely simple means. There is no need for expensive adjusting work. A particularly important advantage afforded by the invention resides in that the electrical components which are required need not be located close to the engine but may be combined at a desired distance from the engine.

Published German Application No. 29 20 669 mentioned hereinbefore contains the remark that optoelectronic signal generators cannot be used because their operation would be affected by oil droplets, air bubbles or foam. Said remarks apparently relate to an optoelectronic sensor, which is connected to the light transmitter by air-filled passages so that disturbances can actually be caused by air bubbles or foam if the light signal is transmitted through such atmosphere over a long distance.

Because the fuel injector nozzle is elongate and very compact, the light transmitting means preferably comprise two triangular prisms having two short sides each, and each of said prisms is connected at one of its short sides to one of the optical glass fiber lines whereas the two other short sides of the two prisms are parallel and spaced apart and the shutter extends between said short sides facing each other.

In accordance with a preferred feature of the invention the light transmitting means comprise a pentagonal prism having a ridge portion formed with a slot, which is parallel to the ridge and in which the shutter is movably disposed, and the optical glass fiber lines are connected to the base surface of the prism adjacent to respective roof surfaces of the prism. In that case the light transmitting means are integral so that they can be made and installed more easily and the maintenance of the initial geometry will be ensured.

A design which is uncritical from an optical aspect and which will ensure that a rotation of the valve needle will not be obstructed will be obtained if the shutter consists of a plate, which is mounted in the spring seat of the valve needle for rotation about the longitudinal axis of that needle.

It will not be necessary to take a rotation of the valve needle into account if the diaphragm consists of a cylindrical pin.

DETAILED DESCRIPTION OF THE DRAWING

Figure 1:
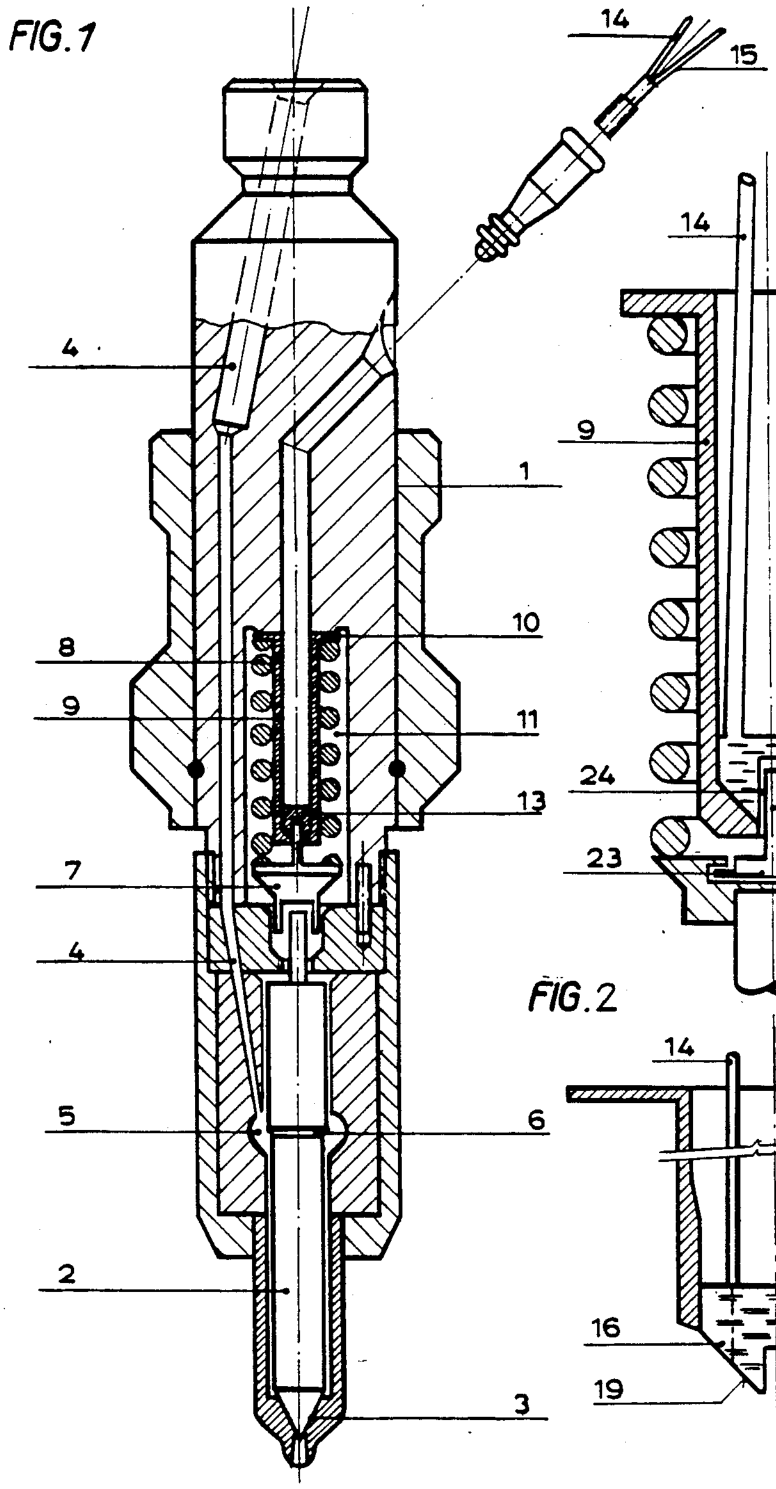
FIG. 1 is a longitudinal sectional view showing a fuel injector nozzle in accordance with the invention.

The invention with further advantages and features thereof will now be described more in detail with reference to illustrative embodiments shown on the drawing.

FIG. 1 shows a fuel injector nozzle which embodies the invention. Most of the mechanical components of that nozzle are known. A nozzle holder 1 contains a valve needle 2, which is slidable in its longitudinal direction and has at its lower end a conical tip, which cooperates with a valve seat 3 provided in the nozzle holder. The fuel to be injected is conducted in a fuel passage 4 to the valve seat 3. The fuel passage 4 communicates in known manner with an annular passage 5 adjacent to a conical surface 6 of the valve needle 2. The valve needle 2 carries at its top end a spring seat 7, which is abutted by the lower end of a helical compression spring 8. A cylindrical bracket 9 extends in the spring 8 and is provided at its top end with an annular spring seat 10, which is abutted by the top end of the spring 8.

In this arrangement the spring 8 urges the valve needle 2 against the valve seat 3 and holds the bracket 9 in a stationary position at the top end of the bore 11, which is formed in the nozzle holder 1 and contains the spring 8 and the bracket 9. In response to a supply of fuel under a sufficiently high pressure to the fuel passage 4, the fuel pressure acting on the conical surface 6 of the valve needle 2 lifts the latter from the valve seat 3. In response to an adequate pressure drop the spring 8 will return the valve needle 2 to its closed position at the valve seat 3.

The invention provides means for detecting the valve stroke and whether the valve needle 2 is in an open or closed position. For this purpose, shutter 12 is secured to the top end of the valve needle 2 or to the spring seat 7, and light transmitting means 13 are provided in the bracket 9 and associated with the shutter 12. As will be described more in detail hereinafter, optical glass fiber lines 14, 15 are connected to the ends of the path defined by light transmitting means 13 and extend out of the nozzle holder 1.

Figure 2:
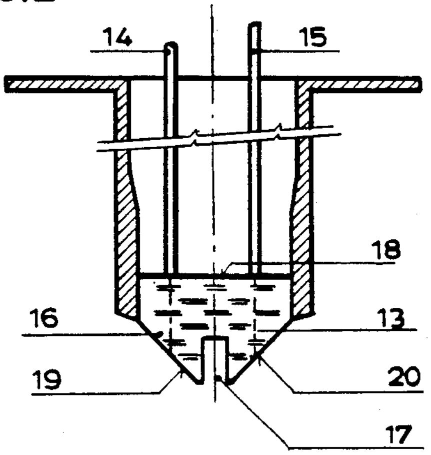
FIG. 2 is a longitudinal sectional view showing on a larger scale a cylindrical bracket provided with a pentagonal prism.
Figure 4:
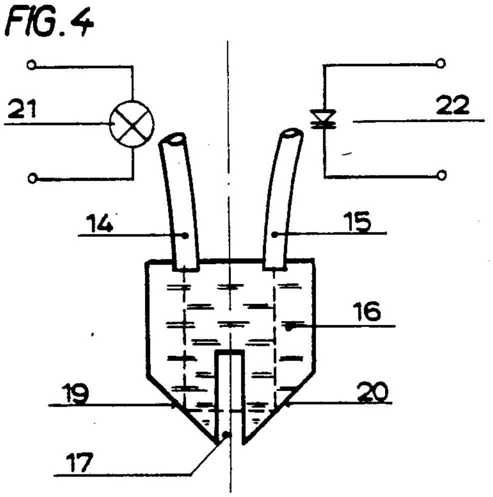
FIG. 4 is a diagrammatic representation illustrating the concept of the measurement.

As shown in FIG. 2 the light transmitting means 13 are constituted by a pentagonal prism 16, which is cemented in the lower end of the bracket 9 and is formed with a slot 17, which extends adjacent to and parallel to the ridge of the prism. Two optical glass fiber lines 14, 15 are connected to the base surface 18 of the prism 16 adjacent to respective roof surfaces 19, 20. One (14) of the two optical glass fiber lines is connected to a light source 21 consisting, e.g., of a light emitting diode. The other line 15 is connected to a photodetector 22 consisting, e.g., of a photodiode (FIG. 4). The light path extending through the slot 17 is indicated by a dotted line. The shutter 12 is movable in the slot 17 and has such a length that the light ray will not be obstructed by the shutter in the slot 17 when the valve needle 2 engages the valve seat 3 and that the shutter 12 will interrupt the light path when the valve needle 2 has been lifted from the valve seat.

Figure 3:
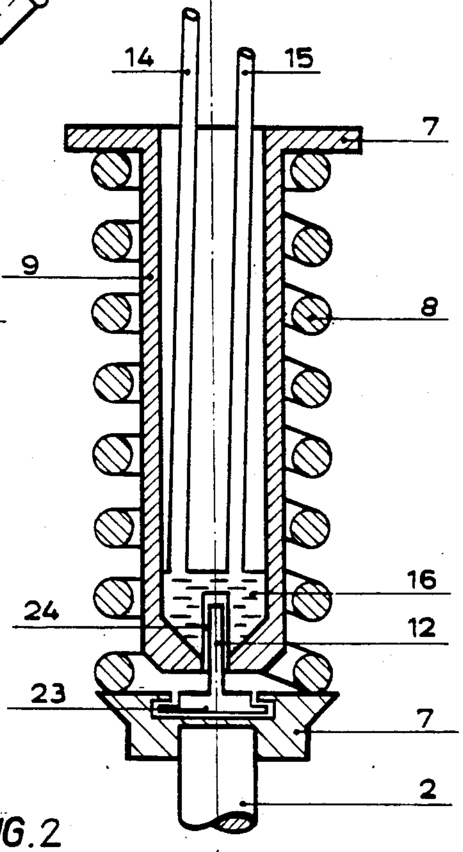
FIG. 3 is a longitudinal sectional view showing a cylindrical insert provided with a pentagonal prism and the upper portion of a valve needle provided with a shutter.

FIG. 3 shows also a pentagonal prism 16 but a difference from the embodiment shown in FIG. 2 resides in that that the lower end of the bracket 9 conforms to the roof surfaces of the prism 16 and is substantially closed so that the prism 16 is safely protected. In all embodiments the cylindrical cavity remaining in the bracket 9 above the prism 16 may be filled with cast plastic material so that the prism 16 and the lines 14, 15 are effectively protected from mechanical influences.

Figure 5:
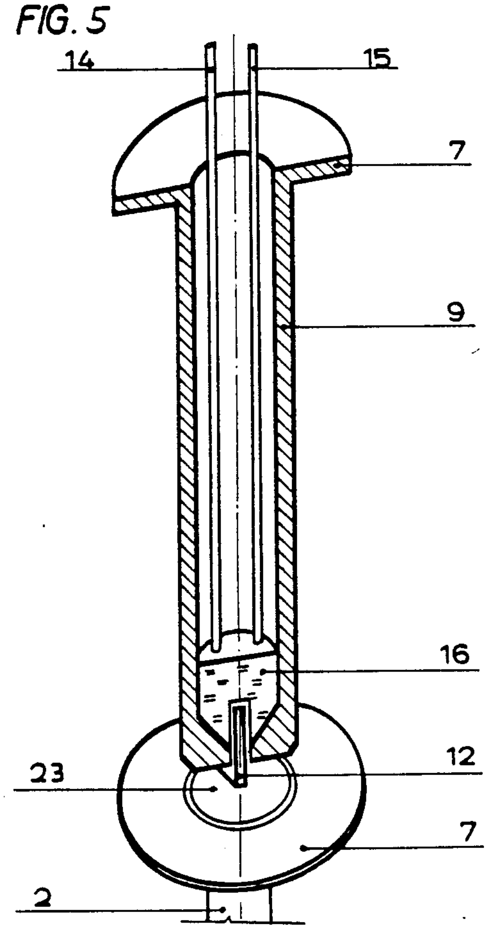
FIG. 5 is a perspective view showing partly in section the arrangement of FIG. 3.

It is also apparent from FIG. 3 that the shutter 12 may be rotatably mounted in the spring seat 7. For this purpose the shutter 12 is provided at its lower end with a laterally protruding base disc, which extends into an annular groove of the spring seat 7 so that the shutter is rotatably mounted and axially substantially fixed in the spring seat 7. In that embodiment the fact that the valve needle 2 is rotated in operation is taken into account, i.e., the needle 2 can rotate freely whereas the shutter plate 12 is guided in the slot 17 or in a corresponding slot 24 of the bottom end wall of the bracket 9 so that the shutter will be maintained in the correct orientation. To facilitate the understanding this embodiment is also shown in a perspective view in FIG. 5.

Figure 6:
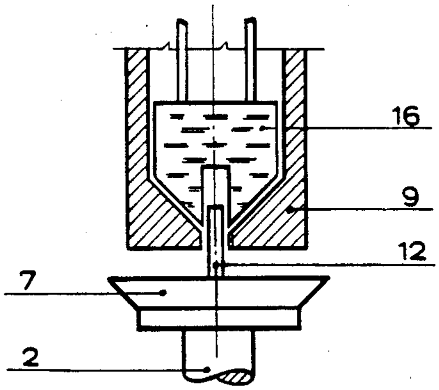
FIG. 6 is a longitudinal sectional view showing a detail of the nozzle provided with a cylindrical shutter.

In the embodiment shown in FIG. 6 the shutter 12 consists of a cylindrical pin, which is firmly connected to the spring seat 7. Because the shutter is cylindrical, the optical geometry will not be altered by a rotation of the valve needle 2.

Figure 7:
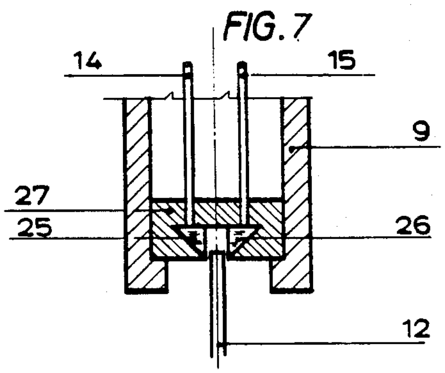
FIG. 7 is a longitudinal sectional view showing a different embodiment of the light transmitting means.

FIG. 7 shows a different embodiment of the light transmitting means 13 cooperating with the shutter 12. Two triangular prisms 25, 26 are provided, which are held in the bracket 9 by a holder 27 and are connected each at one of its short sides to one of the two optical galss fiber lines 14, 15 whereas the two other short sides of the prisms face each other to define the slot 17, in which the shutter 12 is movable.

Figure 8:
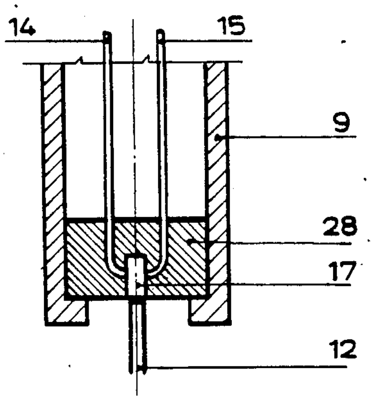
FIG. 8 is a longitudinal sectional view showing a further embodiment of the light transmitting means.

Different light transmitting means 13 are shown in FIG. 8 and do not comprise light-deflecting prisms but are constituted by the two optical glass fiber lines 14, 15, which are bent in a holder 28 in such a manner that their ends define the slot 17 on opposite sides thereof. In the holder 28, the optical glass fiber lines may be embedded in plastic. The glass fiber lines 14, 15 may be provided at their confronting ends with end pieces consisting of glass or the like and having parallel planar end faces defining the slot 17. When the valve needle 2 has been lifted from the valve seat 3, the shutter 12 will interuupt the light ray in the slot 17 between the ends of the optical glass fiber lines 14, 15.

In all embodiments shown by way of example, light transmitting means 13 are associated with the shutter 12, which is connected to the valve needle 2, and the light path defined by said light transmitting means is connected at opposite ends to optical glass fiber lines 14, 15 extending out of the nozzle holder 1. When the valve needle 2 engages the valve seat 3, part of the light emitted by the light source 21 is transmitted through the optical line 14, the light transmitting means including the slot 17, and the optical line 15 to the photodetector 22 so that the latter delivers a corresponding output signal. When the valve needle 2 has been lifted from the valve seat 3 the path for the transmission of light is interrupted at least to a substantial extent so that the output signal of the photodetector will be correspondingly smaller. In response to the output signal of the photodetector 22, a simple evaluating circuit, the details of which are no part of the invention, generates definite binary signals, which indicate whether the needle 2 is in an open or closed position. Such signals can be utilized to control the engine, e.g., to control the time at which the injection of fuel begins. As the fuel consumption rate depends on the time at which the valve of the fuel injector nozzle is opened, a computer having a memory in which the functional relationship of these two parameters is stored can be used to determined in dependence on the output signals the instantaneous fuel consumption rate, which can be read, e.g., from a display.

I claim:

1. In a fuel injector nozzle comprising a nozzle holder containing a valve seat, a valve needle mounted in said nozzle holder for a movement to and away from said valve seat to close and open the same, said valve needle having a first end facing said valve seat and a second end remote from said valve seat, a valve spring mounted in said nozzle holder and urging said valve needle toward said valve seat, a fuel supply line communicating with said valve seat and adapted to apply to said valve needle a pressure tending to move said valve needle away from said valve seat, and a needle lift sensor, which is disposed in said nozzle holder and responsive to the position of said needle, and comprises a shielding member, which is axially coupled to said valve needle, the improvement residing in that said needle lift sensor comprises light transmitting means contained in said nozzle holder and defining a light path, said shielding member comprises an optical shutter, which is axially coupled to said valve needle at said second end thereof and movable across said light path by said valve needle, and said light transmitting means comprises a pentagonal prism having a base surface, a ridge opposite to said base surface, and two roof surfaces adjoining said ridge, said prism being formed with a slot, which is adjacent to and parallel to said ridge, said shutter is movable in said slot, and two optical glass fiber lines for transmitting light to and from said optical path and connected to said base surfaces adjacent to respective ones of said roof surfaces and extending out of said nozzle holder.

2. The improvement set forth in claim 1 as applied to a fuel injector nozzle for use in an internal combustion engine.

3. The improvement set forth in claim 1 as applied to a fuel injector nozzle comprising a spring seat fixed to said valve needle at said second end thereof and engaged by said valve spring, wherein said shutter is axially coupled to said spring seat.

4. The improvement set forth in claim 1 as applied to a fuel injector nozzle comprising a spring seat fixed to said valve needle at said second end thereof and engaged by said valve spring, wherein said shutter is axially coupled to said spring seat, and said shutter comprises a plate which is mounted in said spring seat for rotation about the longitudinal axis of said valve needle.

5. The improvement set forth in claim 1, wherein said shutter consists of a cylindrical pin.

* * * * *